Feb. 13, 1968  K. W. KEELING  3,368,366
MACHINE FOR GLAZING FROZEN FOODS
Filed Feb. 7, 1966
FIG. 1
FIG. 2
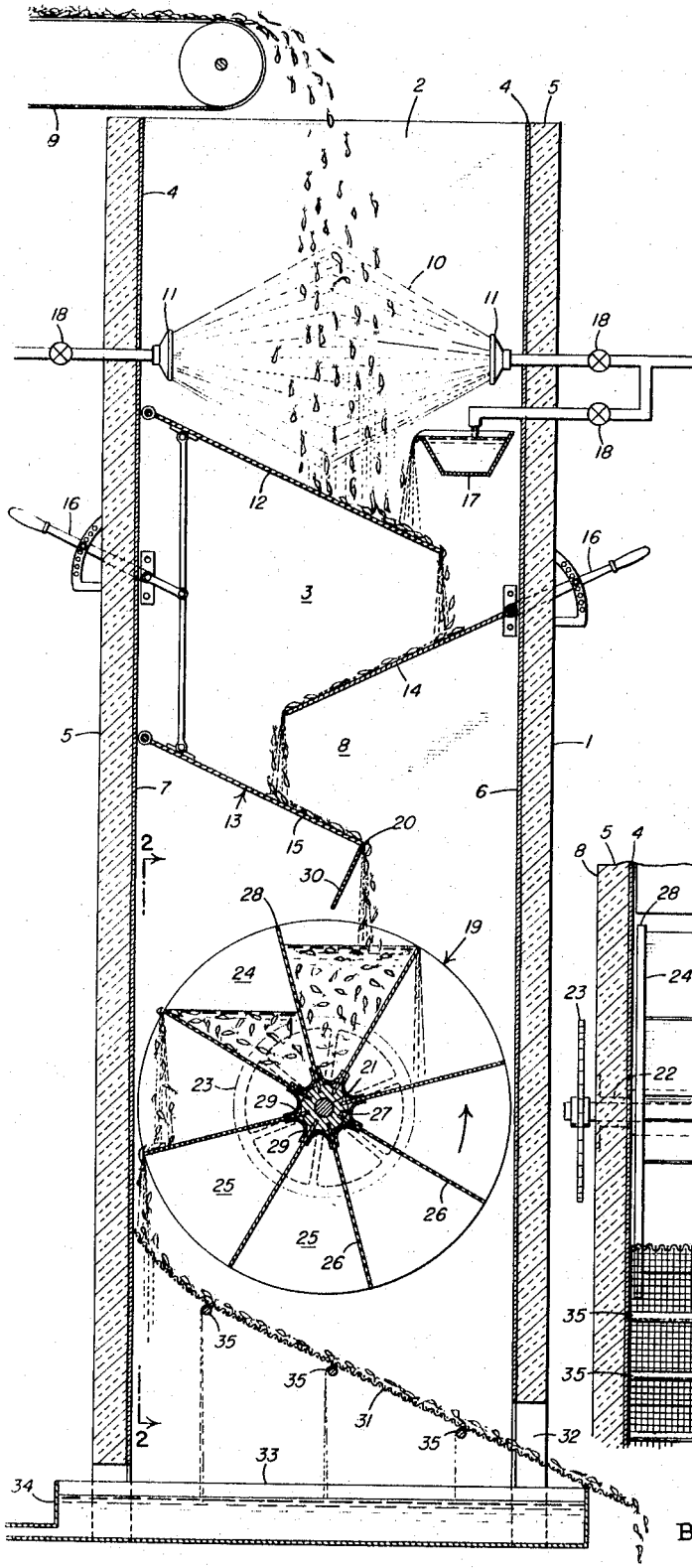
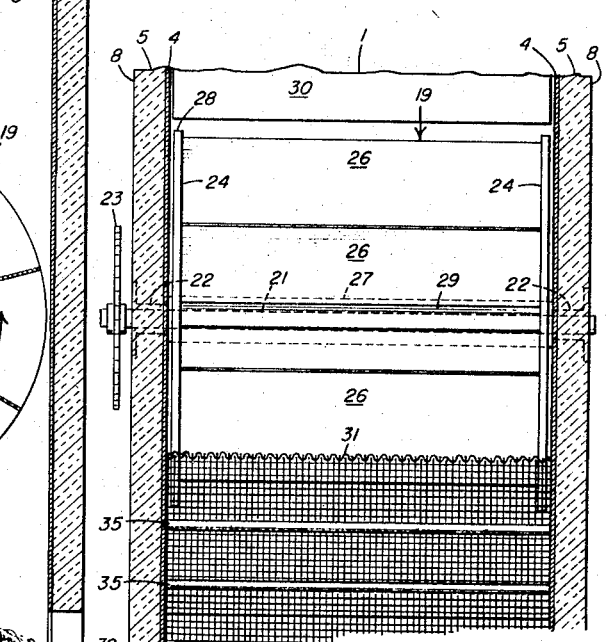
Inventor:
Kenneth W. Keeling
By Wilmer Mechlin
his Attorney

United States Patent Office 3,368,366
Patented Feb. 13, 1968

3,368,366
MACHINE FOR GLAZING FROZEN FOODS
Kenneth W. Keeling, Tampa, Fla., assignor to A. F. Wentworth & Associates, Inc., Tampa, Fla., a corporation of Florida
Filed Feb. 7, 1966, Ser. No. 525,686
14 Claims. (Cl. 62—374)

This invention relates to frozen foods and particularly to the glazing of solid foods after quick freezing and befor packaging for individually coating them with protective sheaths of ice.

Quick frozen solid foods, when dipped or immersed in cold water, will become glazed by freezing upon themselves a sheath of ice. So sheathed, the foods after packaging not only will be sealed against loss of moisture and aromatics, but will be protected from damage by each other in handling. However, the sheath or glaze does not seal unless it is complete and, if too thick, will add unusable weight to the package. Heretofore, it has been difficult in glazing frozen solid foods to ensure that the individual foods are completely ensheathed without obtaining a sheath of greater thickness than required for protection after packaging.

The primary object of the present invention is to provide an improved machine for glazing frozen solid foods, whereby the foods are completely sealed in individual sheaths of controlled thickness.

Another object of the invention is to provide a glazing machine for individually glazing frozen solid foods, wherein the glazing is controlled by feeding the foods and water into side opening compartments of a horizontally rotating drum which are successively filled and emptied as the drum rotates at a regulated rate relative to the rate and temperature of the feed.

A further object of the invention is to provide a machine for individually glazing quick frozen solid foods, wherein individually quick frozen foods are preconditioned by being sprayed with water before being immersed in a water bath, thereby reducing the duration of the immersion required to produce the desired glaze.

An additional object of the invention is to provide a machine for individually glazing individually quick frozen solid foods, whereby the factors determining the completeness and thickness of the glaze are readily controlled and the water remaining from the glazing is effectively separated from the glazed foods and recirculated to take advantage of its low temperature.

Other objects and advantages of the invention will appear hereinafter in the detailed description, be particularly pointed out in the appended claims and be illustrated in the accompanying drawings, in which:

FIGURE 1 is a central vertical sectional view of a preferred embodiment of the glazing machine of the present invention; and FIGURE 2 is a fragmentary vertical sectional view taken along lines 2—2 of FIGURE 1.

Referring now in detail to the drawings, in which like reference characters designate like parts, the improved glazing machine of the present invention is particularly designed for individually glazing frozen solid foods which have been individually quick frozen by suitable means, such as the apparatus disclosed in Carpenter Patent No. 3,020,732, issued Feb. 13, 1962.

Individually quick frozen at a low temperature, which, in the case of the Carpenter apparatus, may be on the order of −70° to −80° F., the shrimp or other frozen solid foods preferably are fed or delivered direct from the quick freezing apparatus to the glazing machine so as to enter the latter without substantial change in their temperature. The preferred glazing machine has a housing or casing 1 in the form of an upright or vertical hollow tower or column of substantially rectangular cross-section, which is open at its top or upper end 2 and closed at its sides. The interior 3 of the tower 1 is lined at the sides by a stainless steel or other suitable liner 4 which is contained in a jacket 5 of suitable insulating material and therewith forms the tower's insulated front and rear walls 6 and 7 and side walls 8.

Fed from the freezing apparatus to the glazing machine by an endless belt or other suitable feed conveyor 9, which preferably is of variable or regulatable linear speed, the individual frozen foods are fed, delivered or discharged into the open top 2 of the housing 1 and, except in a zone in which they are immersed in water, move, flow or fall by gravity through the tower. As they move downwardly in the tower 1, the frozen foods are given a preliminary glazing to condition them for the main glazing operation by being passed through a spray 10 of cold or ice water. Chilled by a chiller (not shown), the ice water conveniently is sprayed on the falling frozen foods by opposed nozzles 11 mounted in the upper end portion of the tower 1 on the front and rear walls 6 and 7.

On passing through the spray 10, the frozen foods fall or drop onto the first 12 of a series 13 of downwardly inclined or sloping baffle plates arranged in a zigzag pattern between the front and rear walls 6 and 7 for directing the frozen foods in a zigzag path through the intermediate portion of the tower occupied by the plates. Each hinged or pivoted at its proximal end at or adjacent one of the front and rear walls 6 and 7 and inclined or sloping downwardly toward the other or opposite wall, with its distal end spaced inwardly therefrom, the preferred baffle plates of the series 13 are adjustable in pitch for enabling the rate of movement of the foods therealong to be controlled or regulated. For the illustrated series 13, which in addition to the first or leading plate 12, includes an oppositely inclined intermediate plate 14 and a bottom or end plate 15 inclined in the same direction as and paralleling the first plate, the desired pitch adjustment conveniently is obtained by a pair of manual adjusting levers 16, each extending through one of the front and rear walls 6 and 7 and linked, as suitable, to one or more of the plates.

The ice water from the spray 10 for the most part falls with the partly glazed frozen foods onto the series of baffle plates 13 and, in flowing downwardly therealong, washes or lubricates the upper surfaces of the plates and prevents the foods from sticking or freezing thereto. Any additional ice water required either for assisting the spray water in preventing the foods from sticking to the baffle plates or for the main glazing, hereafter to be described, or both, can be supplied as needed by a supplemental supply, that illustrated being a spillover trough 17 mounted in and extending across the tower 1 inside the front wall 6 between the adjoining nozzle 11 and the distal end of the top baffle plate 12 in such position as to spill water over a side onto an underlying part of the top plate 12 intermediate the latter's ends. The amount of ice water supplied to each of the nozzles 11 and the trough 17 preferably is individually regulatable or controllable by regular valves 18.

In the lower portion of the tower 1 and spaced below the baffle plates of the series 13, is a drum 19 mounted for horizontal rotation about an axis which preferably extends laterally of the tower parallel to the distal end or lip 20 of the bottom plate 15 and for this purpose has an axle 21 centered transversely or laterally on and journalled in suitable bushings or bearings 22 in the side walls 8. For driving it at a rate or speed of rotation that can be varied, as desired, the drum 19 has on one end of its axle 21 outwardly of the adjoining side wall 8 a drive sprocket 23 drivably connected to a variable speed electric motor or other suitable drive (not shown). The drum 19 is closed at the ends by end plates or discs 24 and partitioned or compartmented between the end plates to form a plurality of side or radially opening compartments 25 for successive presentation to and filling by the individual frozen foods and ice water dropping off or falling or cascading from the overlying lip 20 of the bottom baffle plate 15. The compartments 25 are all of the same size or capacity and conveniently are formed at the sides and circumferentially spaced or separated by partitions or divider plates 26 extending outwardly from the drum's hub 27 to its side or periphery 28. Uniformly or equally spaced, circumferentially of the drum, the partitions 26 form or bound with the end plates 24, the compartments 25, which, with the preferred arrangements of the partitions, are sectoral or sector-shaped troughs. For easy cleaning the compartments 25 should be rounded at their bottoms 29, as by welding concave webs between the partitions or by forming the compartments individually and welding them together.

Of substantially the width of the interior 3 of the tower 1, the baffle plates 12, 14 and 15 of the series 13 collect the frozen foods and water falling haphazardly upon the top plate 12 into a stream having the upper surfaces of the plates as its bed and cascading from the distal end of one plate to the upper surface of the next. Directed by the plates and controlled in its rate of flow by their inclination, the stream of frozen foods and water is spread more and more evenly across the baffles as it flows from one to the next, until, on reaching the distal end or lip 20 of the bottom plate 15, its frozen foods and water are substantially uniformly distributed across the width of the plate. With its ingredients so distributed, the stream then cascades or falls in a cascade from the lip 20 of the bottom plate 15 into and over the length, between the end plates 24, of the then underlying or presented compartment 25 of the glazing drum 19. It is this last cascade of the stream that in the preferred embodiment is depended upon not only to feed or deliver the frozen foods for glazing to the drum but also to supply the water with which they are glazed.

While the open-sided, compartmentalized glazing drum 19 may be rotated or turned in either direction, the horizontal disposition or position of the lip 20 of the bottom plate 15 relative to the drum's axis and the compartments 25, preferably is such that the stream or cascade of frozen foods and water falling from the lip, will be directed or flow into each compartment as the latter approaches or moves toward its upright or vertical position and the flow will be discontinued at about the time the particular compartment begins to be drained, emptied or decanted of its contents. Thus, if, as in the illustrated embodiment, the drum is turned counter-clockwise, as viewed in FIGURE 1, so that the upper part of the drum and then upwardly opening compartments 25 move counter the direction of movement of the stream along the bottom plate 15, the lip 20 of that plate should be horizontally offset forwardly or toward the front wall 6 of the tower 1 relative to the drum's axis so that the stream will enter the presented compartment at a point along the circumference or periphery 28 of the drum horizontally in advance or forward of the drum's axis. It also is preferred to provide the bottom plate 15 with an integral or rigidly connected depending flange 30 extending its full width below the lip 20 and inclined downwardly away from the fall line of the stream, to prevent spreading of the latter and interference with its direction into the drum 19 by a back or reverse flow of water along the underside of the plate.

As each compartment 25 moves or turns beyond its top or upper vertical position, it begins to decant, empty or drain, the decanting commencing either immediately or later, depending upon the extent to which the compartment is filled and, in any case, being completed by the time the partition 26 at the compartment's leading side has reached a horizontal position. The then fully or completely glazed frozen foods and the remaining water discharged from the compartments 25, as they empty in succession, fall onto or are caught by a screen 31 underlying the drum 19. Extending across or the width of the interior 3 of the tower 1, the screen 31 slopes or is inclined downwardly from the point at which it receives the frozen water and passes through an outlet or discharge opening 32 in the bottom part of the front wall 6. Extending in the illustrated embodiment from the rear wall 7 through the front wall 6, the screen 31 is of such mesh as to retain the glazed foods and pass or discharge the water to an underlying accumulator trough 33 in the base 34 of the tower 1 and so sloped that the glazed foods will slide by gravity along it through the outlet 32. Cross-bars or other suitable cross-supports 35, extending across the tower beneath the screen 31, not only support the screen intermediate its ends but by capillary attraction catch the water flowing from above along the screen and direct it downwardly into the acccumulator trough 33, thus increasing the efficiency of the draining or separation of the water from the glazed foods.

Practically free of water, the individually glazed frozen foods are ready for packaging when they leave or are discharged from the glazing machine and may be conducted to the part of the plant in which the packaging operation is performed by a conveyor or other suitable means (not shown). As is customary in food processing machinery, the various parts of the glazing machine exposed to the frozen foods and ice water, including the liner 4 of the tower and the accumulator trough 33, preferably are made of stainless steel or like readily cleanable material. Neither contaminated nor warmed by its passage through the tower 1, the water drained into the accumulator trough 33 is recirculated to the chiller and, after adding fresh water as necessary, introduced through the nozzles 8 and spillover trough 14, with corresponding saving in operating cost.

In moving by gravity through the glazing machine, except during the interval in which their progress is interrupted by their dwells in the compartments 25 of the glazing drum 19, the individually frozen foods for which the machine is particularly designed maintain their individuality or discreteness to the point of discharge, any tendency to bond or conglomerate, particularly as they pass through the baffle plate series 13, being inhibited by the rapidity of their progress and the presence of the water in the stream in which they flow. The completeness and thickness of the glaze on each individual food or food particle is determined in the last analysis by the duration of its immersion in the water bath in one of the compartments 25 of the revolving rotating glazing drum 19. However, by initiating the formation of the glaze, the preliminary glazing by the spray 10, as the foods enter the machine, very substantially reduces the time required for the final glazing and makes feasible the reduction of that time to a matter of seconds. Thus, the disclosed eight-compartment glazing drum 19, with a diameter of around 18 inches, will usually be rotated within a range of 1 to 3 r.p.m., so that the immersion at even the low end of the range will be less than 30 seconds. Too, even though the filling and draining of each compartment is gradual, the cascading of the frozen foods from a height into a presented compartment will in effect cause the compartments to be filled from the bottom and, since they are drained from the top, substantially equalize the duration of the immersion among the particles. While its output of glazed foods of course cannot exceed the frozen food input, the glazing machine operates at maximum capacity when the compartments 25 are filled to capacity and, given a demand for this capacity, the rate of movement of the frozen foods to the drum and the amount of water added can readily be matched by the controls at the machine to the drum speed required for the desired glaze thickness.

From the above detailed description, it will be apparent that there has been provided an improved machine for glazing frozen foods which is particularly applicable to individually frozen foods and is readily controllable in the glaze it produces. It should be understood that the described and disclosed embodiment is exemplary of the invention and that all modifications are intended to be included that do not depart from the spirit of the invention and the scope of the appended claims.

Having described my invention, I claim:

1. A machine for glazing frozen foods comprising a drum rotatable on a horizontal axis, a plurality of circumferentially spaced compartments opening onto a side of said drum, and means operative on rotation of said drum for successively filling said compartments with water and from above with foods previously frozen and at a temperature at which said water will be frozen thereon as a surface glaze, said compartments on continued rotation of said drum successively discharging by gravity glazed frozen foods and any excess water.

2. A machine according to claim 1 including means for loading the compartments from above with frozen foods and water.

3. A machine according to claim 1 wherein the compartments extend lengthwise of the drum and are circumferentially spaced by radial partitions.

4. A machine according to claim 1 wherein the drum is variable in its speed of rotation for regulating the duration of the immersion of the frozen foods in water in each of the compartments.

5. A machine according to claim 1 including spray means in advance of the drum for spraying the frozen foods with water to condition them for glazing in the drum.

6. A machine according to claim 2 wherein the frozen foods feed thereto are individually frozen, the machine including spray means for spraying the frozen foods with water in advance of the drum, and baffle means for directing the frozen foods from the spray means into the compartments in the drum.

7. A machine according to claim 6 including means for supplying additional water as the frozen foods pass along the baffle means.

8. A machine according to claim 6 wherein the baffle means are adjustable in inclination and the spray and supply means are regulatable for controlling the rate of filling of the compartments.

9. A machine according to claim 1 including downwardly sloping screen means beneath the drum for receiving the glazed foods and water discharged by the compartments and separating the water from the foods as the foods move therealong.

10. A machine according to claim 9 wherein the screen is supported and water flowing therealong is caught by spaced cross-supports.

11. A machine according to claim 9 wherein the water drained from the glazed frozen foods by the screen is caught in an underlying accumulator trough for reuse in the machine.

12. A machine according to claim 6 wherein the baffle means are a series of baffle plates arranged to direct the frozen foods and water in a zigzag path toward the drum, and the bottom baffle plate is spaced above the drum for discharging the foods and water in a cascade into the compartments of the drum as they are presented for filling.

13. A machine according to claim 2 wherein the machine has a housing in the form of an upright tower insulated at the sides and open at the top for receiving frozen foods.

14. A machine according to claim 13 wherein the tower is rectangular in cross-section and has an opening adjacent a bottom of a wall at a side thereof through which the frozen foods are discharged after glazing.

References Cited

UNITED STATES PATENTS

| 2,200,331 | 5/1940 | Fisher | 62—381 X |
| 2,638,759 | 5/1953 | Barris | 62—64 |
| 2,723,645 | 11/1955 | Garapolo. | |
| 2,758,445 | 8/1956 | Saxe | 62—64 X |
| 3,048,987 | 8/1962 | Wentworth | 62—381 X |
| 3,097,501 | 7/1963 | Pappas | 62—64 X |
| 3,250,086 | 5/1966 | Morris | 62—64 X |

ROBERT A. O'LEARY, *Primary Examiner.*

W. E. WAYNER, *Assistant Examiner.*